United States Patent
Chung

(10) Patent No.: US 7,224,253 B2
(45) Date of Patent: May 29, 2007

(54) ASSEMBLING STRUCTURE OF FIELD COIL

(75) Inventor: Sukjae Chung, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 62 days.

(21) Appl. No.: 10/543,621

(22) PCT Filed: Jan. 29, 2004

(86) PCT No.: PCT/KR2004/000154

§ 371 (c)(1),
(2), (4) Date: Jul. 28, 2005

(87) PCT Pub. No.: WO2004/067982

PCT Pub. Date: Aug. 12, 2004

(65) Prior Publication Data

US 2006/0145803 A1    Jul. 6, 2006

(30) Foreign Application Priority Data

Jan. 29, 2003   (KR) .................. 10-2003-0005772
Jan. 29, 2004   (KR) .................. 10-2004-0005566

(51) Int. Cl.
*F16D 27/112*   (2006.01)
*H01F 5/04*     (2006.01)
*H01F 27/30*    (2006.01)

(52) U.S. Cl. ................. 335/299; 192/84.1; 192/84.96; 336/107; 336/192

(58) Field of Classification Search ............... 192/84.1, 192/84.9, 84.96, 84.961; 335/296–299; 336/107, 336/192
See application file for complete search history.

(56) References Cited

U.S. PATENT DOCUMENTS

| 4,432,446 | A |   | 2/1984  | Okano et al.           |
|-----------|---|---|---------|------------------------|
| 5,307,038 | A | * | 4/1994  | Ishimaru ........ 335/296 |
| 5,508,671 | A |   | 4/1996  | Takashi                |
| 5,812,044 | A | * | 9/1998  | Sakamoto ........ 335/299 |
| 5,967,282 | A | * | 10/1999 | Takahashi ........ 192/84.961 |
| 6,169,347 | B1| * | 1/2001  | Sakamoto et al. ........ 310/78 |

* cited by examiner

*Primary Examiner*—Ramon M. Barrera
(74) *Attorney, Agent, or Firm*—Fulbright & Jaworski L.L.P.

(57) ABSTRACT

The present invention relates to an assembling structure of field coil, which has a simple mounting structure for a diode and a resistor to cut an off-noise of an electromagnetic clutch and to prevent damage of peripheral parts due to surge voltage generation when power source applied to an electronic coil body is cut off, thereby improving a mounting efficiency, reducing a manufacturing cost by reduction of the number of parts, and realizing an automatic production. The assembling structure of field coil includes an electronic coil body (101), a core ring (110) and a sleeve (120) having a first and second terminals (131) (132), and a case that has a receiving part (135) and a first and second connection parts (136) (137).

18 Claims, 11 Drawing Sheets

PRIOR ART

PRIOR ART

PRIOR ART

PRIOR ART

ASSEMBLING STRUCTURE OF FIELD COIL

This application is a § 371 of PCT/KR2004/000154 filed Jan. 29, 2004, and claims priority from Korean Patent Application No. 10-2003-0005772 filed Jan. 29, 2003 and Korean Patent Application No. 10-2004-0005566 filed Jan. 29, 2004.

TECHNICAL FIELD

The present invention relates to an assembling structure of field coil, and more particularly, to an assembling structure of field coil, which has a simple mounting structure for a diode and a resistor to cut an off-noise of an electromagnetic clutch and to prevent damage of peripheral parts due to surge voltage generation when power source applied to an electronic coil body is cut off, thereby improving a mounting efficiency, reducing a manufacturing cost by reduction of the number of parts, and realizing an automatic production.

BACKGROUND ART

In general, a field coil assembly of an electromagnetic clutch is an electric device for transmitting driving force of a pulley rotating by an engine to a hub disc of a compressor driving shaft in such a manner that an electromagnetic field is formed by electromagnetic induction of a wound coil when power source is supplied, and the hub disc of the compressor driving shaft is attracted to the friction surface of the pulley by electromagnetic force and dynamically connected.

Furthermore, the field coil assembly serves to control operation of a cooling system of an air-conditioning apparatus by controlling driving power to the compressor according to whether or not to apply power source to the coil.

As shown in FIGS. 1 and 2, the field coil assembly of the electromagnetic clutch includes an electronic coil body 11 formed by winding an electronic coil in the form of a ring; a bobbin 13 for receiving the electronic coil body 11 and having a pair of lead wires 12 connected with a pair of extracted wires 11a drawn out from the electronic coil body 11, the lead wires 12 being exposed to the outside; a core ring 14 for receiving the bobbin 13 in which the electronic coil body 11 is contained, the core ring 14 being inserted and mounted into the pulley and fixed to the compressor 1; and a cover 15 for sealing the open surface of the core ring 14 to prevent separation of the electronic coil body 11 and the bobbin 13 from the core ring 14.

Each lead wire 12 has a connecting member (not shown) mounted at an end portion thereof to be connected with a connector 5 connected with the external power source, so that electromagnetic field is formed on the electronic coil body 11.

In the field coil assembly 10, when the power source applied to the electronic coil body 11 is cut off, the electronic coil body 11 generates surge voltage and counter electromotive force. When surge voltage and counter electromotive force are generated, it may have a bad influence, such as occurrence of short, on the peripheral electronic parts.

Therefore, a diode 21 is installed to the lead wires 12 of the electronic coil body 11 to prevent generation of surge voltage and counter electromotive force, and thereby, maintaining a normal condition of voltage.

Meanwhile, when the diode 21 is installed to the lead wires 12, a close circuit is formed by blocking surge voltage and counter electromotive force, and a weak attraction force acts due to residual electric current of the electronic coil body 11, so that a hub 4 and a disc 4a do not drop down rapidly from the friction surface 3a of the pulley 3 when power source is cut off.

That is, the hub 4 and the disc 4a drop down slowly from the friction surface 3a of the pulley 3 due to formation of the close circuit by the diode 21, and thereby, off-noise, which is friction noise among the hub 4, the disc 4a and the friction surface 3a of the pulley 3, is generated.

To prevent off-noise of the electromagnetic clutch, the diode 21 and a resistor 22 are connected to each other in series, and then, the resistor 22 is connected to the lead wires 12 in parallel, so that the resistor can absorb the residual electric current of the electronic coil body 11. Thereby, when power source is cut off, the weak attraction force acting to the electronic coil body 11 is removed, and off-noise of the electromagnetic clutch is prevented while the disc 4a of the hub 4 rapidly drops down from the friction surface 3a of the pulley 3.

As described above, to prevent generation of off-noise and surge voltage of the electromagnetic clutch, as shown in FIGS. 3 and 4, the diode 21 and the resistor 22 are connected to the lead wires 12 in parallel. At this time, the diode 21 and the resistor 22 are connected to each other in series by welding lead wires 23 extending from sides thereof with each other, lead wires 23a extending from the other sides of the diode 21 and the resistor 22 are connected to the lead wires 12 by splices 24.

To protect and insulate the field coil assembly from the outside, first, the splices 24 are covered with a covering material 25, second, the diode 21 and the resistor 22 are covered with other covering material 26, and finally, the covered parts are finished with a finish covering material 27.

Also, in a case in which only the diode 21 is connected to the lead wire 12, the above connecting and covering methods are applied in the same way.

Therefore, the conventional field coil assembly 10 has several problems in that a manufacturing cost is expensive due to lots of parts, and in that it is impossible to automatically manufacture the field coil assembly due to complicated manufacturing processes when only the diode 21 is mounted or the diode 21 and the resistor 22 are mounted.

DISCLOSURE OF INVENTION

Accordingly, the present invention is directed to an assembling structure of field coil that substantially obviates one or more problems due to limitations and disadvantages of the related art. An object of the present invention is to provide an assembling structure of field coil, which has a simple structure for mounting a diode or a diode and a resistor to a field coil assembly, thereby improving a mounting efficiency, reducing a manufacturing cost by reducing the number of parts and manufacturing processes, and automatically manufacturing the field coil assembly.

To achieve the above object, the present invention provides an assembling structure of field coil comprising: an electronic coil body formed by winding of an electronic coil; a core ring for receiving the electronic coil body, the core ring having a sleeve connection part at which a pair of lead wires drawn out from the electronic coil body are located; and a sleeve including a first connection part for receiving one end portions of a first and second terminals connected with the lead wires of the sleeve connection part and being connected to the sleeve connection part, a second connection part for receiving the other end portions of the first and second terminals therein and being connected to a connector for supplying the external power source, and a receiving part formed between the first and second connection parts for receiving a diode connected with the first and second terminals, wherein the first connection part, the second connection part, and the receiving part are formed integrally by injection molding in a state that the first and second terminals are inserted into them.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

Reference will now be made in detail to the preferred embodiments of the present invention, examples of which are illustrated in the accompanying drawings.

Description of the same parts and functions as the prior arts will be omitted.

Figure 1:
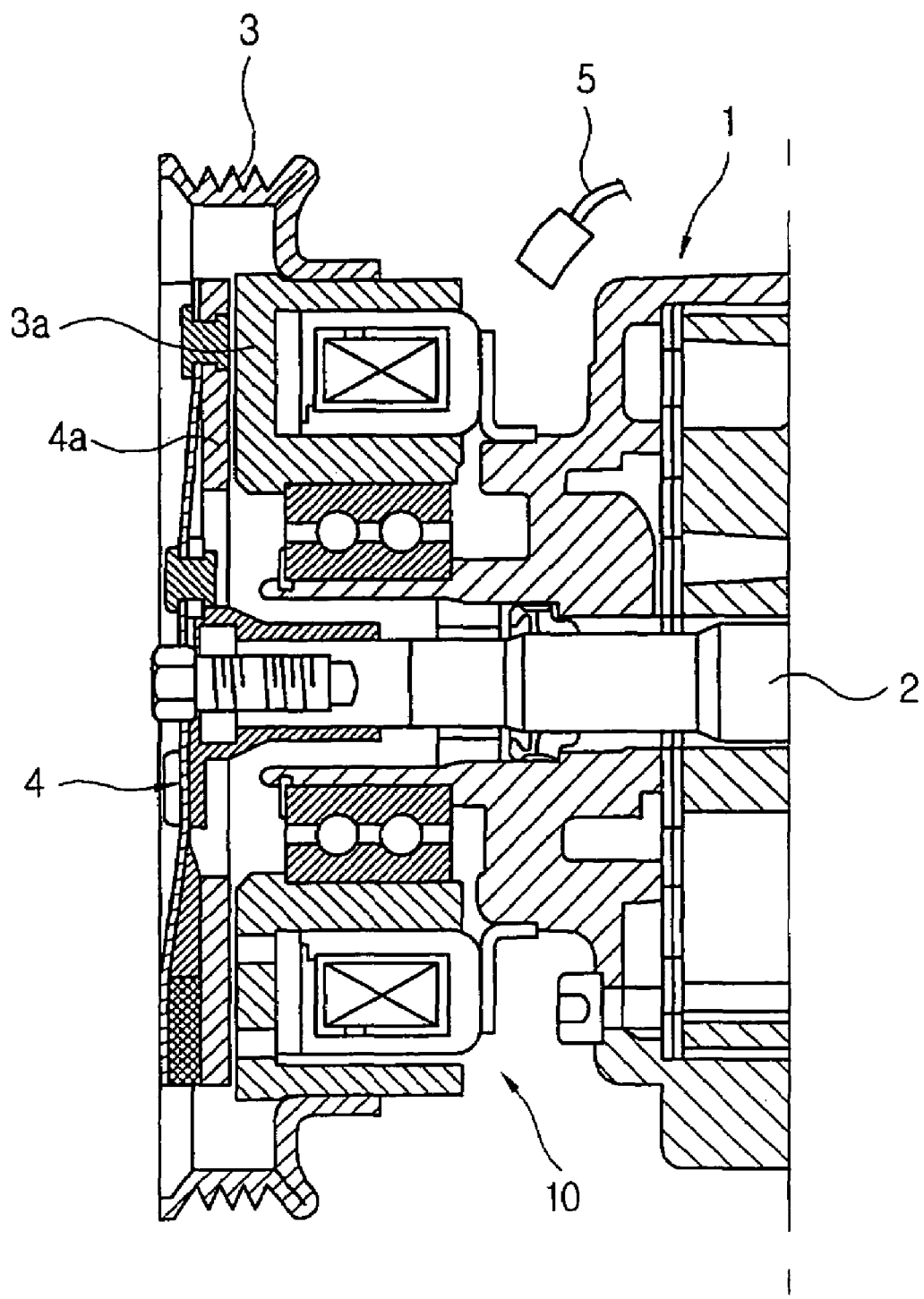
FIG. 1 is a partially sectional view of a conventional compressor.
Figure 2:
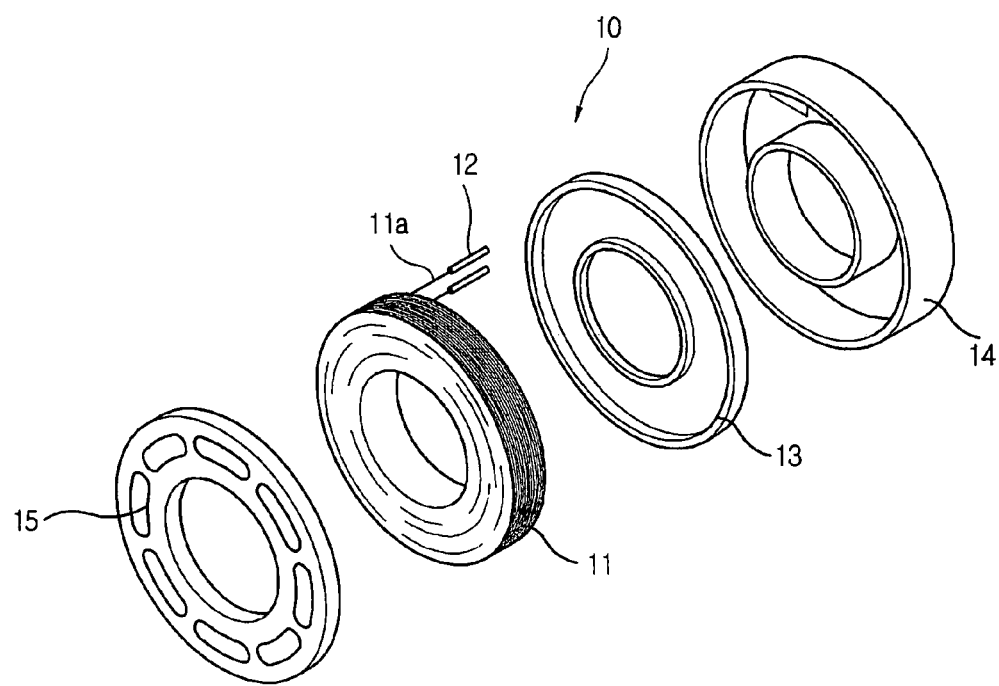
FIG. 2 is an exploded perspective view of a conventional field coil assembly.
Figure 3:
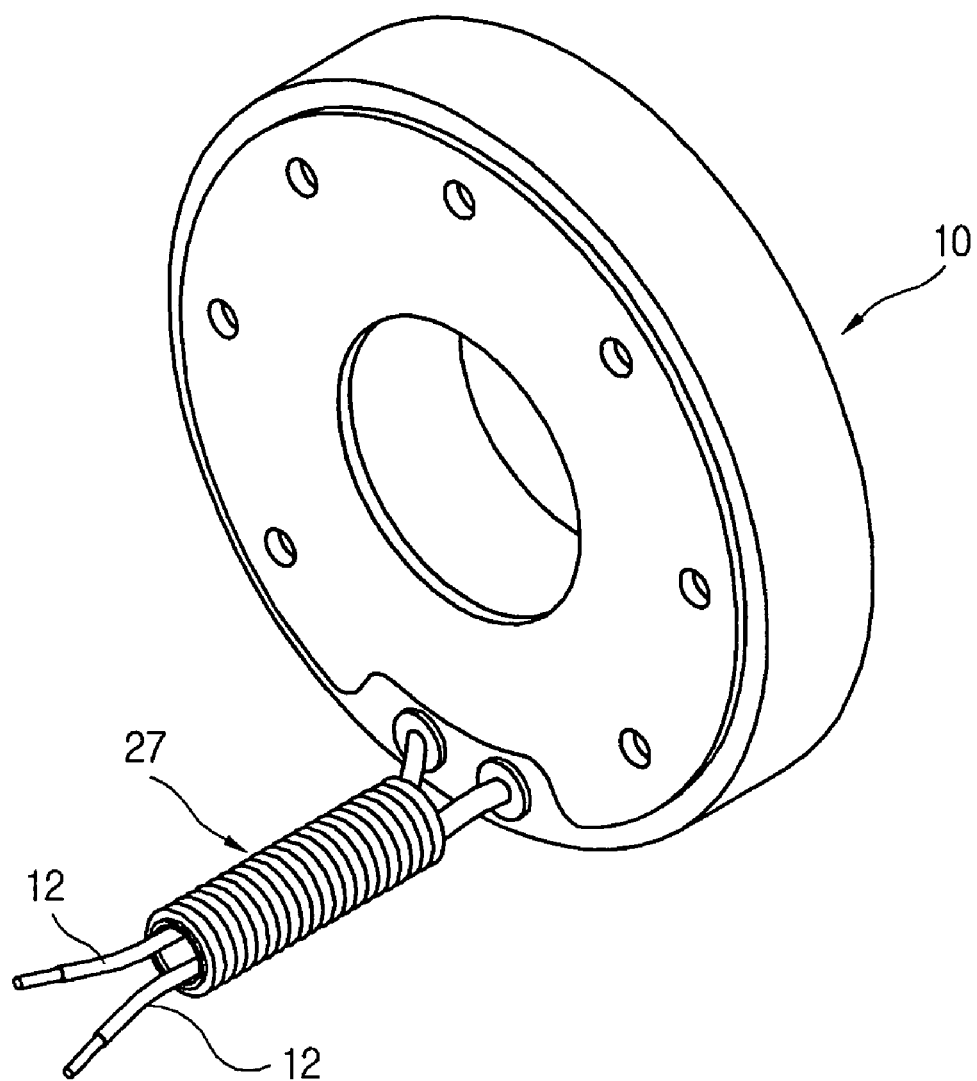
FIG. 3 is a perspective view showing a state in which a diode and a resister are connected to lead wires of the conventional field coil assembly and covered with a finish covering material.
Figure 4:
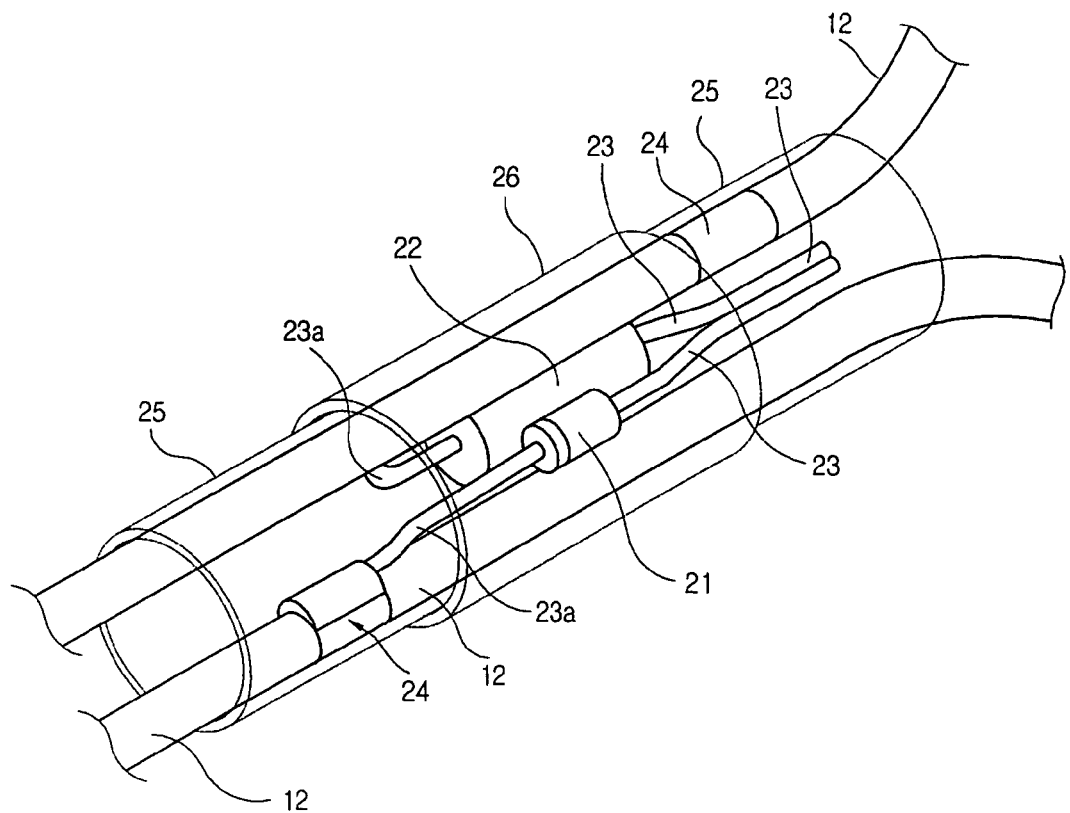
FIG. 4 is a perspective view showing a state in which a conventional diode and a conventional resistor are connected with each other.
Figure 5:
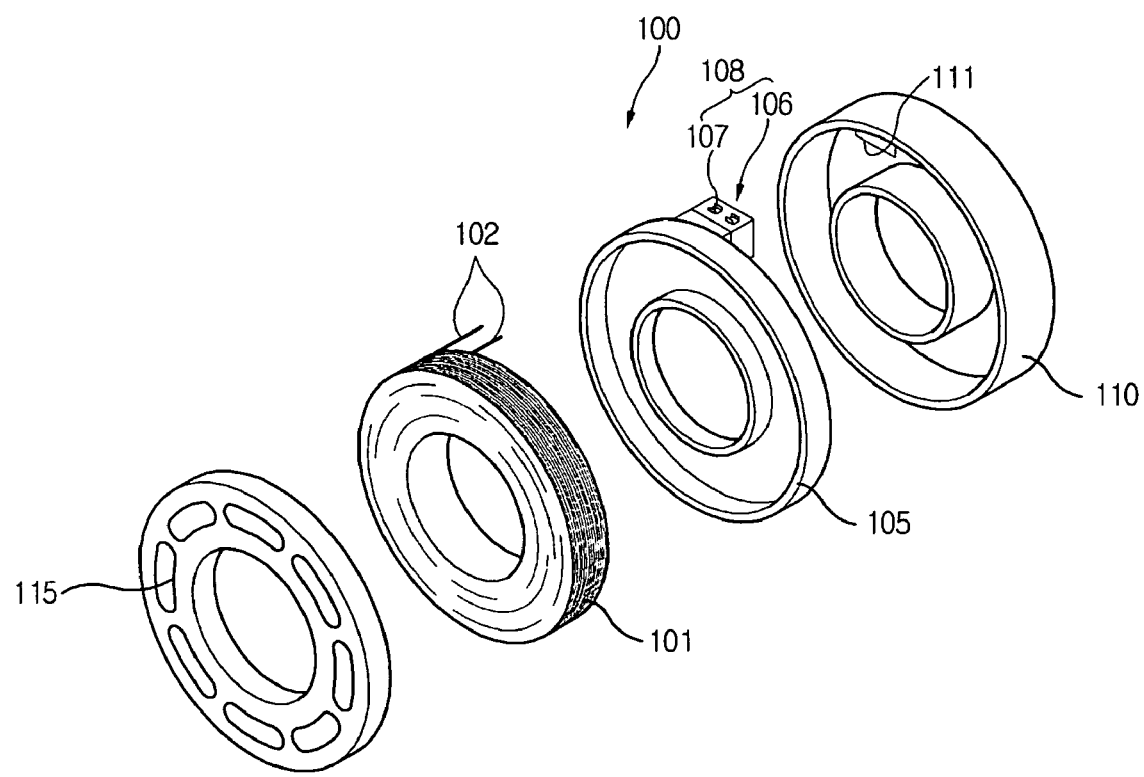
FIG. 5 is an exploded perspective view of a field coil assembly according to a first preferred embodiment of the present invention.
Figure 6:
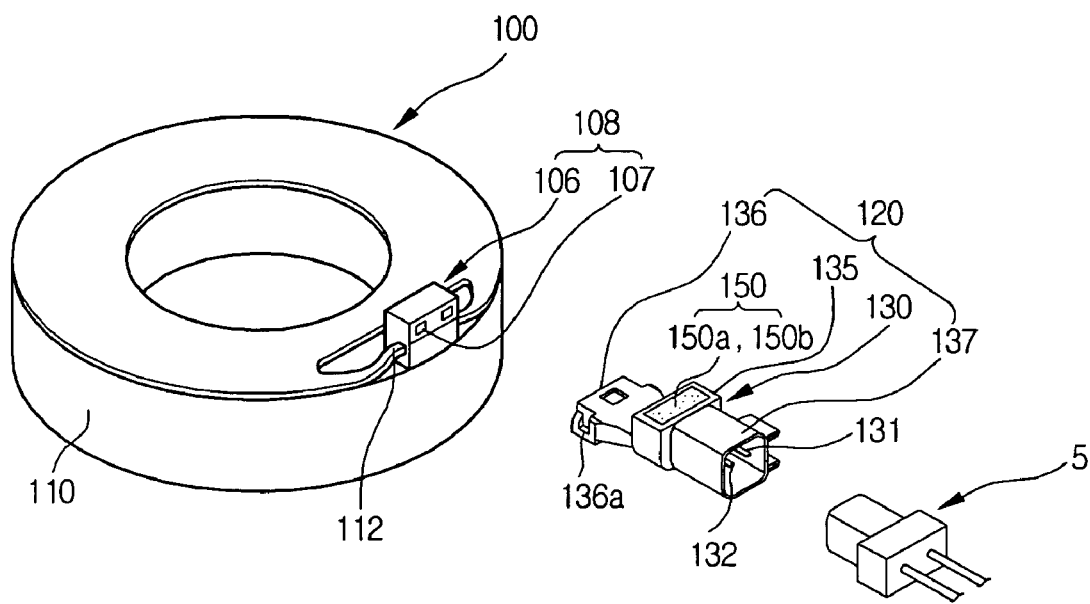
FIG. 6 is a perspective view of a sleeve in which the field coil assembly of the first preferred embodiment, a diode and a resistor are embedded.
Figure 7:
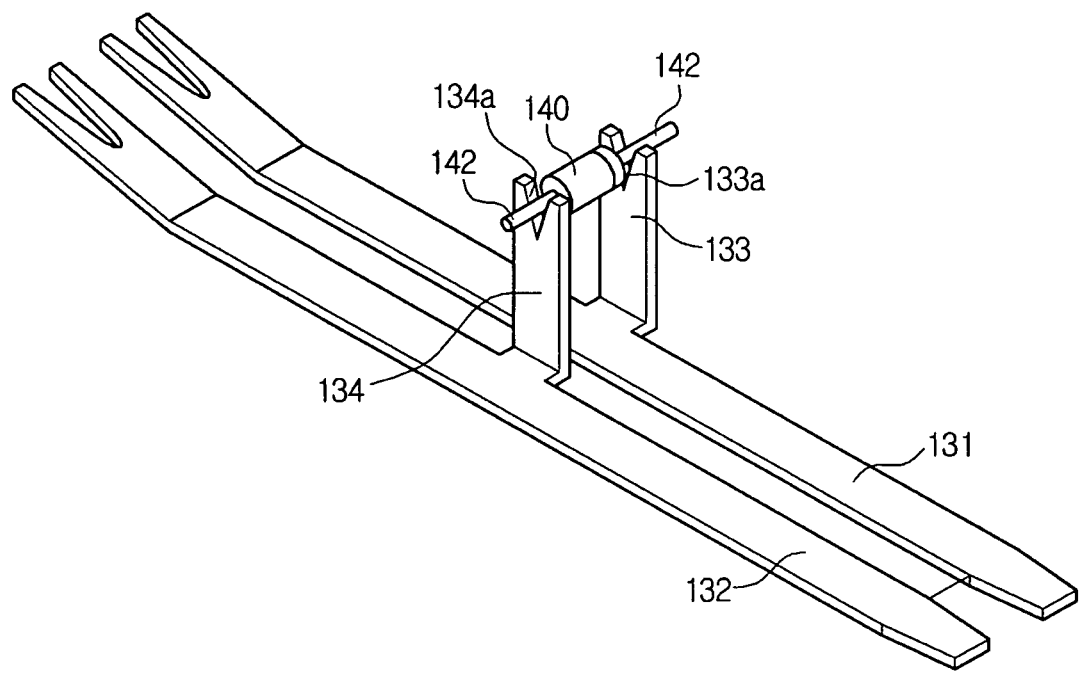
FIG. 7 is a perspective view showing a connection relation between terminals and the diode before the sleeve of the first preferred embodiment is injection-molded.
Figure 8:
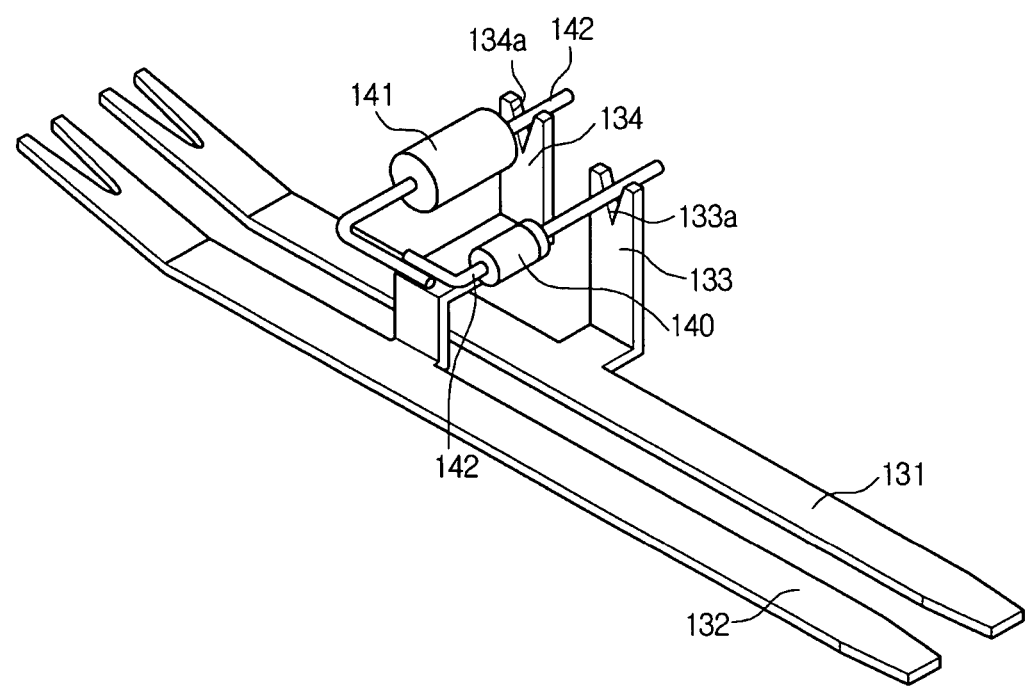
FIG. 8 is a perspective view showing a connection relation among the terminals, the diode, and the resistor before the sleeve of the first preferred embodiment is injection-molded.
Figure 9:
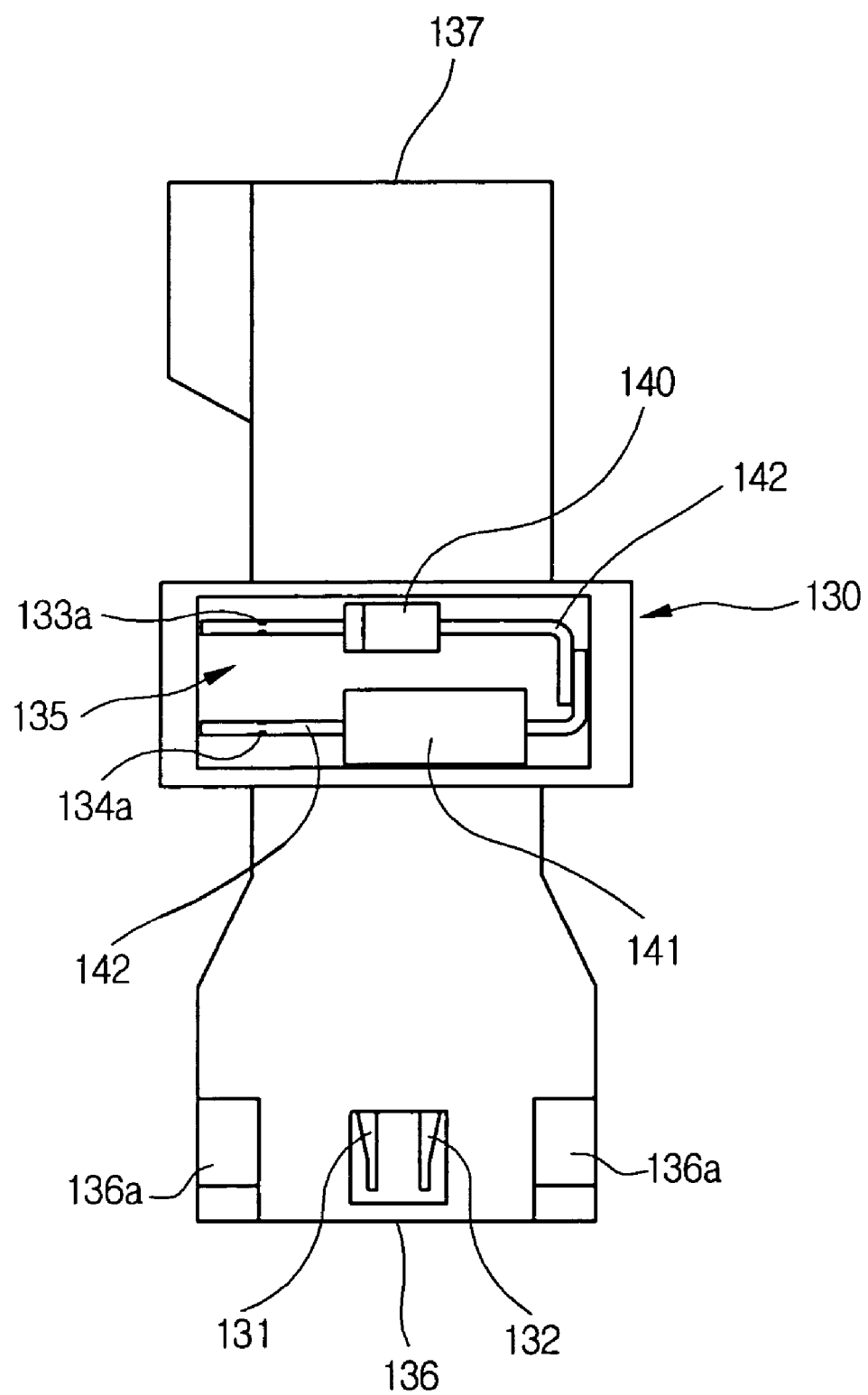
FIG. 9 is a plan view showing a state before a protector is formed after the diode and the resistor are seated on seating slots of the sleeve.

FIG. 5 is an exploded perspective view of a field coil assembly according to a first preferred embodiment of the present invention, FIG. 6 is a perspective view of a sleeve in which the field coil assembly of the first preferred embodiment, a diode and a resistor are embedded, FIG. 7 is a perspective view showing a connection relation between terminals and the diode before the sleeve of the first preferred embodiment is injection-molded, FIG. 8 is a perspective view showing a connection relation among the terminals, the diode, and the resistor before the sleeve of the first preferred embodiment is injection-molded, and FIG. 9 is a plan view showing a state before a protector is formed after the diode and the resistor are seated on seating slots of the sleeve.

As shown in the drawings, the field coil assembly 100 according to the first preferred embodiment of the present invention is a hard shell type, and includes: an electronic coil body 101 formed by winding an electronic coil in a ring form; a core ring 110 for receiving the electronic coil body 101 therein and having a sleeve connection part 108 at which a pair of lead wires 102 drawn out from the electronic coil body 101 are located; and a sleeve 120, which has a diode 140 for preventing surge voltage and counter electromotive force generated when power source is cut off, an end portion thereof is connected to the sleeve connection part 108a and the other end portion thereof is connected to a connector 5 for supplying the external power source.

Here, the electronic coil body 101 is contained in the core ring 110 in a condition in which it is inserted into a bobbin 105, and an open surface of the core ring 110 is sealed with a cover 115 so as to prevent the electronic coil body 101 and the bobbin 105 from being separated from the core ring 110.

The sleeve 120 includes first and second terminals 131 and 132 for electrically connecting the connector 5 and the lead wires 102 with each other to apply the external power source to the electronic coil body 101.

Furthermore, a case 130 includes: a first connection part 136 for receiving one end portions of the first and second terminals 131 and 132 therein and connected to the sleeve connection part; a second connection part 137 for receiving the other end portions of the first and second terminals 131 and 132 therein and connected to the connector 5 for supplying the external power source; and a receiving part 135 formed between the first and second connection parts 136 and 137 for receiving the diode 140 connected with the first and second terminals 131 and 132.

That is, the case 130 is injection-molded in a state in which the first and second terminals 131 and 132 are inserted into the case 130.

The field coil assembly further includes a resistor 141 to prevent off-noise generated from an electromagnetic clutch when power source is cut off, and the resistor 141 is connected to the diode 140 in series.

Here, if off-noise is weak, the resistor 141 can be omitted. The first and second terminals 131 and 132 have connecting portions 133 and 134 extending from sides thereof respectively, so that the diode 140 can be connected with the first and second terminals 131 and 132 in parallel.

Moreover, in case of that the diode 140 and the resistor 141, which are connected with each other in series, are mounted, it is preferable that seating slots 133a and 134a formed in end portions of the connecting portions 133 and 134 of the first and second terminals 131 and 132 are arranged along the longitudinal direction of the terminals to mount the diode 140 and the resistor 141 within a restricted space of the sleeve 120.

Here, the seating slots 133a and 134a of the connecting portions 133 and 134 are exposed from the receiving part 135 when the case 130 is injection-molded, and lead wires 142 of the diode 140 or of the diode and resistor assembly are seated on the exposed seating slots 133a and 134a.

At this time, it is preferable that the diode 140 seated on the seating slots 133a and 134a is inserted inwardly from the outer surface of the receiving part 135 to a predetermined depth.

After the diode 140 is seated on the seating slots 133a and 134a, a protector 150 is mounted to protect and insulate the diode 140 from the outside.

The protector 150 may have a protective cover 150a for protecting the diode 140 seated on the receiving part 135 of the case 130 or may be formed by molding a resin material 150b into the receiving part 135.

In case of the protector 150 formed by molding the resin material 150b, the resin material 150b of a melted condition is charged toward the diode 140 seated on the receiving part 135 to cover the diode 140, and then, the outward appearance of the sleeve 130 can be maintain in a good condition after the resin material 150b is hardened.

The sleeve connection part 108 includes a protruding connection part 106, which is mounted at a side of the bobbin 105 containing the electronic coil body 101 therein and has a connection terminal 107 connected with the lead wire 102, so that the protruding connection part 106 and the first connection part 136 of the sleeve 120 are connected with each other.

Here, the protruding connection part 106 is inserted and arranged into a through hole 111 of the core ring 110.

In addition, the core ring 110 has coupling protrusions 112 formed at both sides of the protruding connection part 106 and the first connection part 136 of the sleeve 120 has a coupling groove 136a for coupling the coupling protrusion 112 to the first connection part 136 so as to maintain a condition in which the sleeve 120 is connected to the protruding connection part 106.

A function of the assembling structure of the field coil according to the present invention will be described as follows.

First, the first connection part 136 of the sleeve 120 is connected to the protruding connection part 106, and the second connection part 137 is connected to the connector 5 connected with the external power source. After that, the external power source is applied to the electronic coil body 101 passing through the connector 5, the sleeve 120 and the protruding connection part 106 in order.

When the power source is applied, electric current does not flow to the diode 140 and the resistor 141 due to directional feature of the diode 140, but the diode 140 and the resistor 141 are operated together when power source is cut off.

That is, when power source is cut off, counter electromotive force and surge voltage generated from the electronic coil body 101 are prevented by the diode 140. At this time, as electric current flows also through the resistor 141, it prevents zero surge voltage generated when only the diode 140 is mounted, so that surge voltage somewhat more than zero surge voltage and still less than surge voltage generated when there is no diode 140.

Therefore, the present invention can prevent damage of peripheral parts due to generation of counter electromotive force and surge voltage, and prevent off-noise of the electromagnetic clutch by the resistor 141 absorbing residual electric current of the electronic coil body 101 when power source is cut off.

The sleeve 120 can be injection-molded in large quantities and easily mounted during an assembling process of the field coil assembly, thereby improving mounting efficiency and realizing automatic production.

Furthermore, the sleeve has a simple structure, and so, a manufacturing cost is reduced due to reduction of the manufacturing processes and the number of parts.

Figure 10:
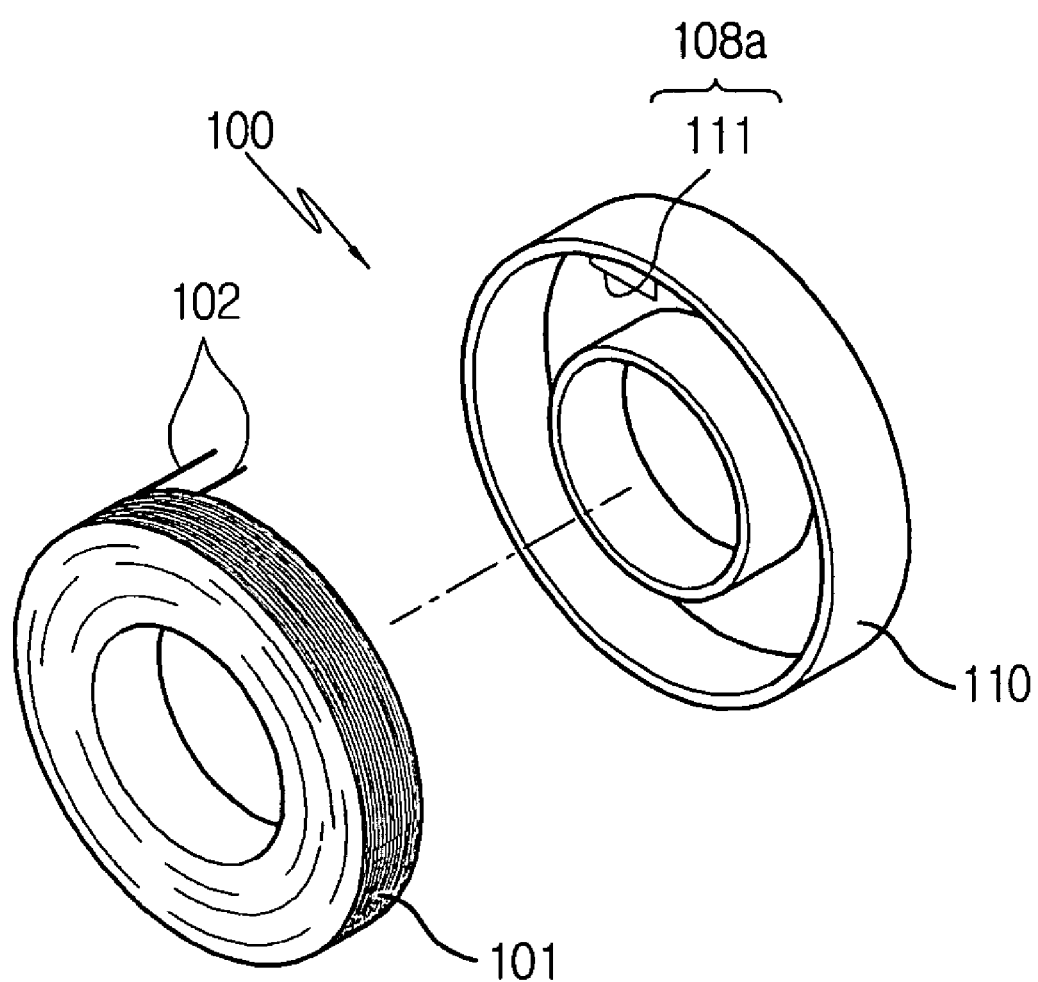
FIG. 10 is an exploded perspective view of a field coil assembly according to a second preferred embodiment of the present invention.
Figure 11:
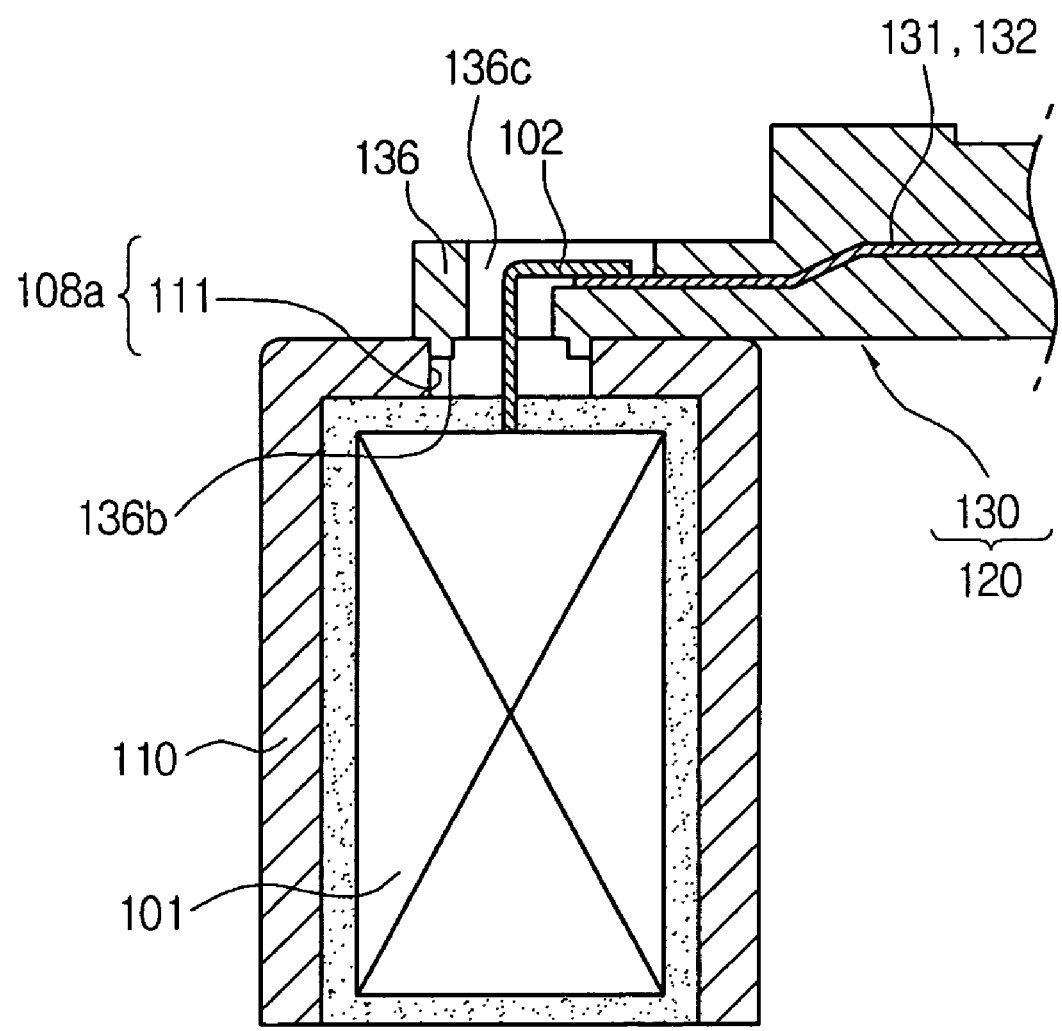
FIG. 11 is a partially sectional view showing a state in which the sleeve of FIG. 10 is coupled with a through hole of a core ring, and lead wires of coils are connected with terminals.
Figure 12:
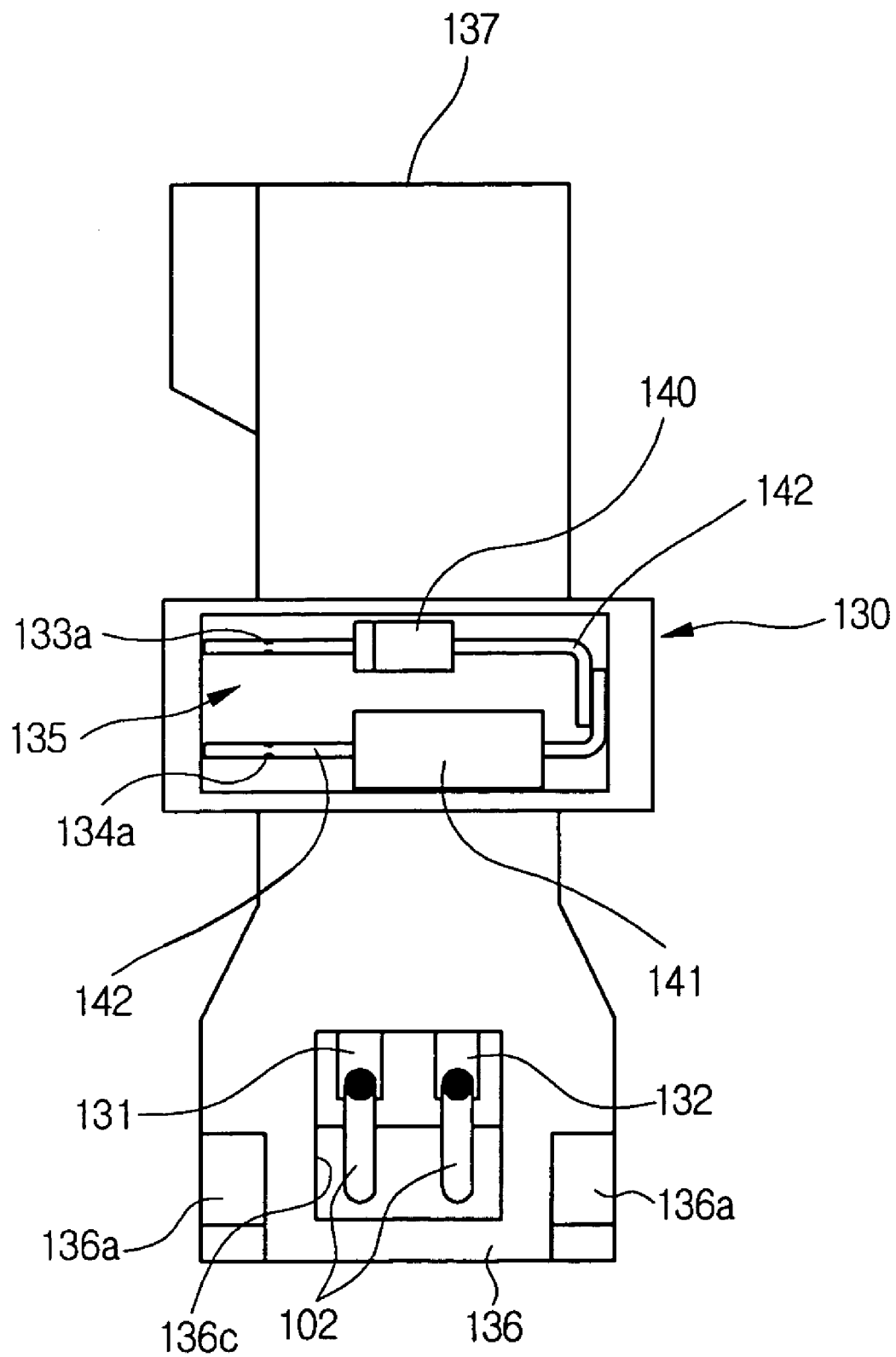
FIG. 12 is a plan view of the sleeve of FIG. 11.

FIG. 10 is an exploded perspective view of a field coil assembly according to a second preferred embodiment of the present invention, FIG. 11 is a partially sectional view showing a state in which the sleeve of FIG. 10 is coupled with a through hole of a core ring, and lead wires of coils are connected with terminals, and FIG. 12 is a plan view of the sleeve of FIG. 11. Only different parts from the first embodiment will be described, and description of the same parts as the first embodiment will be omitted.

As shown in the drawings, the field coil assembly 100 according to the second preferred embodiment of the present invention is an epoxy type, and includes: an electronic coil body 101 formed by winding an electronic coil in a ring form; a core ring 110 for receiving the electronic coil body 101 therein and having a sleeve connection part 108a at which a pair of lead wires 102 drawn out from the electronic coil body 101 are located; and a sleeve 120, which has a diode 140 for preventing surge voltage and counter electromotive force generated when power source is cut off, an end portion thereof is connected to the sleeve connection part 108a and the other end portion thereof is connected to a connector 5 for supplying the external power source.

Here, the electronic coil body 101 is inserted into the core ring 110, and then, a resin material (epoxy) is charged to insulate and fix the electronic coil body 101.

The sleeve connection part 108a has a through hole 111 formed at a side of the outer surface of the core ring 110 for passing the lead wire 102 therethrough, so that the lead wire 102 and the first connection part 136 of the sleeve 120 are connected with each other.

That is, in the first embodiment, the protruding connection part 106 formed on the bobbin 105 is located in the through hole 111 of the core ring 110, but in the second embodiment, the first connection part 136 of the sleeve 120 is directly connected to the through hole 111 of the core ring 110.

Therefore, the first connection part 136 of the sleeve 120 has a fixed connection part 136b formed integrally with the lower surface thereof, which will be inserted into the through hole 111 of the core ring 110.

The lead wires 102 drawn out through the through hole 111 of the core ring 110 are bended, and bonded with the first and second terminals 131 and 132 disposed on the sleeve 120 by soldering or welding.

Meanwhile, it is preferable that the first connection part 136 of the sleeve 120 has an opening 136c formed in the upper surface thereof for bonding of the lead wire 102 and the first and second terminals 131 and 132.

After the lead wires 102 and the first and second terminals 131 and 132 are bonded together, the resin material is molded or a protective cover is mounted inside the opening 136c for protection and insulation from the outside.

INDUSTRIAL APPLICABILITY

As described above, the assembling structure of the field coil according to the present invention provides the sleeve of a simple structure, in which the diode and the resistor for preventing generation of surge voltage and off-noise of the electromagnetic clutch are embedded, thereby improving a mounting efficiency, reducing the manufacturing cost due to reduction of the number of the parts and manufacturing processes, and realizing an automatic production.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An assembling structure of field coil comprising:
an electronic coil body formed by winding of an electronic coil;
a core ring for receiving the electronic coil body, the core ring having a sleeve connection part at which a pair of lead wires drawn out from the electronic coil body are located; and
a sleeve including a first connection part for receiving one end portions of a first and second terminals connected with the lead wires of the sleeve connection part and being connected to the sleeve connection part, a second connection part for receiving the other end portions of the first and second terminals therein and being connected to a connector for supplying the external power source, and a receiving part formed between the first and second connection parts for receiving a diode connected with the first and second terminals, wherein the first connection part, the second connection part, and the receiving part are formed integrally by injection molding in a state that the first and second terminals are inserted into them, wherein the sleeve connection part includes a protruding connection part disposed at a side of a bobbin containing the electronic coil body therein, in which a connection terminal connected with the lead wire is embedded, so that the protruding connection part and the first connection part of the sleeve are connected with each other and wherein the connection terminal is horizontally disposed toward an outer side of the protruding connection part.

2. The assembling structure of field coil according to claim 1, further comprising a resistor serially connected with the diode.

3. The assembling structure of field coil according to claim 1, wherein the first and second terminals have connecting portions extending from sides thereof respectively, so that the diode is connected to the first and second terminals in parallel.

4. The assembling structure of field coil according to claim 3, wherein a resistor is connected to the diode in series, and seating slots are formed in end portions of the connecting portions of the first and second terminals respectively and arranged along the longitudinal direction of the terminals.

5. The assembling structure of field coil according to claim 1, wherein the sleeve connection part has a through hole formed at a side of the outer surface of the core ring for passing the lead wire therethrough to connect the lead wire and the first connection part of the sleeve with each other.

6. The assembling structure of field coil according to claim 5, wherein a fixed connection part is disposed on at least one of the sleeve connection part and the first connection part.

7. The assembling structure of field coil according to claim 1, wherein the receiving part further includes a protector for protecting the diode from the outside.

8. The assembling structure of field coil according to claim 7, wherein the protector is a protective cover connected to the receiving part of a case.

9. The assembling structure of field coil according to claim 7, wherein the protector is formed by molding a resin material into the receiving part of the case.

10. An assembling structure of field coil comprising:
an electronic coil body formed by winding of an electronic coil;
a core ring for receiving the electronic coil body, the core ring having a sleeve connection part at which a pair of lead wires drawn out from the electronic coil body are located; and
a sleeve including a first connection part for receiving one end portions of a first and second terminals connected with the lead wires of the sleeve connection part and being connected to the sleeve connection part, a second connection part for receiving the other end portions of the first and second terminals therein and being connected to a connector for supplying the external power source, and a receiving part formed between the first and second connection parts for receiving a diode connected with the first and second terminals, wherein the first connection part, the second connection part, and the receiving part are formed integrally by injection molding in a state that the first and second terminals are inserted into them and wherein the sleeve connection part comprises a protruding connection part having a connection terminal such that the sleeve is horizontally and slidably connected to the protruding connection part at a side of the protruding connection part.

11. The assembling structure of field coil according to claim 10, further comprising a resistor serially connected with the diode.

12. The assembling structure of field coil according to claim 10, wherein the first and second terminals have connecting portions extending from sides thereof respectively, so that the diode is connected to the first and second terminals in parallel.

13. The assembling structure of field coil according to claim 12, wherein a resistor is connected to the diode in series, and seating slots are formed in end portions of the connecting portions of the first and second terminals respectively and arranged along the longitudinal direction of the terminals.

14. The assembling structure of field coil according to claim 10, wherein the sleeve connection part has a through hole formed at a side of the outer surface of the core ring for passing the lead wire therethrough to connect the lead wire and the first connection part of the sleeve with each other.

15. The assembling structure of field coil according to claim 14, wherein a fixed connection part is disposed on at least one of the sleeve connection part and the first connection part.

16. The assembling structure of field coil according to claim 10, wherein the receiving part further includes a protector for protecting the diode from the outside.

17. The assembling structure of field coil according to claim 16, wherein the protector is a protective cover connected to the receiving part of a case.

18. The assembling structure of field coil according to claim 16, wherein the protector is formed by molding a resin material into the receiving part of the case.

* * * * *